United States Patent Office 3,171,500
Patented Mar. 2, 1965

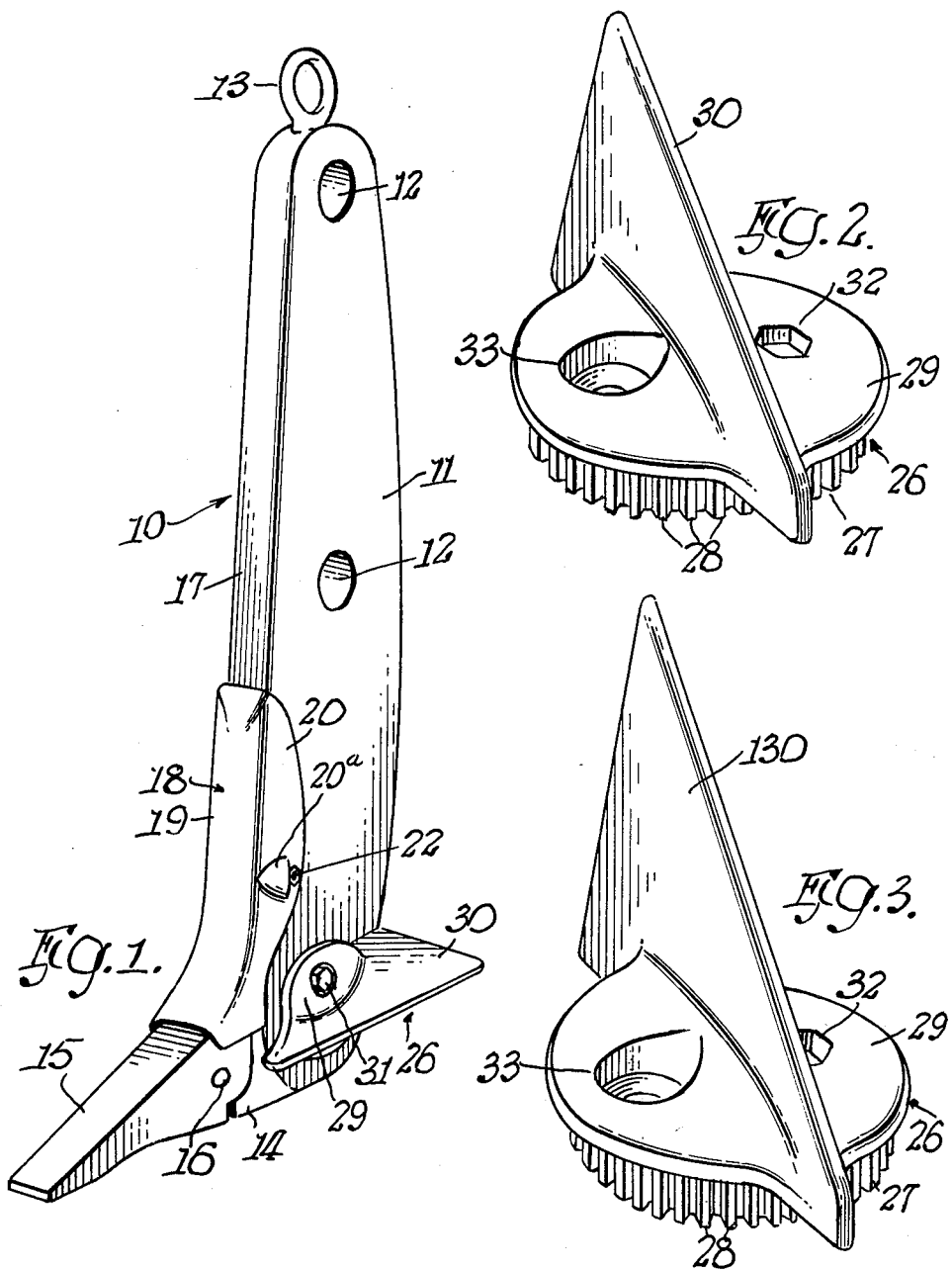

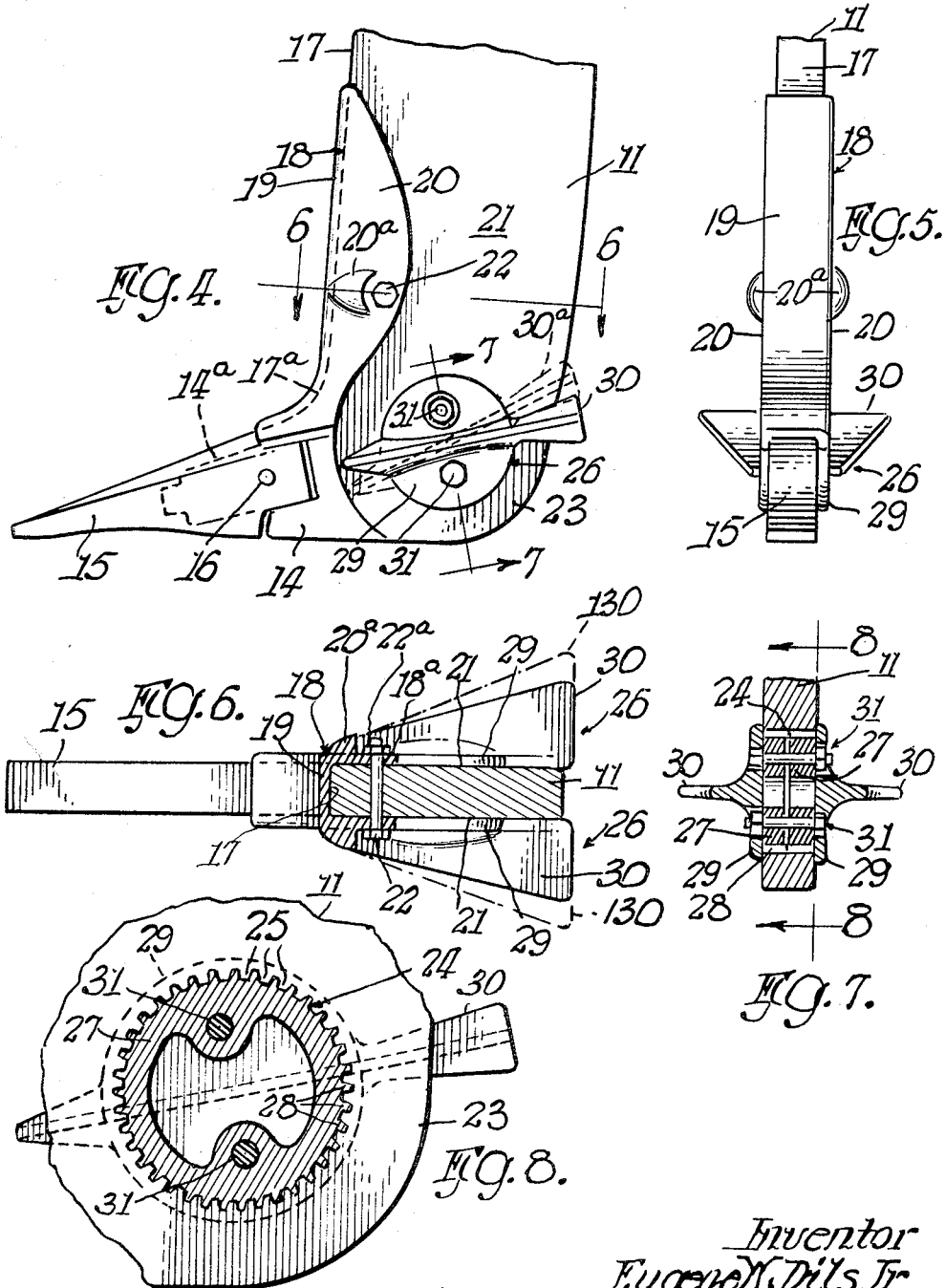

3,171,500
GROUND WORKING DEVICE
Eugene W. Dils, Jr., Portland, Oreg., assignor to Esco Corporation, Portland, Oreg., a corporation of Oregon
Filed Apr. 4, 1962, Ser. No. 185,036
3 Claims. (Cl. 172—700)

This invention relates to a ground working device and, more particularly, to a ripper shank.

A ripper is generally positioned on the rear of a tractor and has one or more shanks or standards that extend vertically downward into the ground. The lower extremity of each shank is equipped with a foot-like portion which penetrates the ground and upsets the ground while traveling some distance below the surface of the ground, i.e., several feet.

In certain types of ripping, the ripper cuts a very narrow path through the material, which leaves it in a condition still difficult to remove. From this, it can be inferred that the principal use of a ripper is for loosening hard to remove ground so that other excavating or earth working equipment can follow. Attempts in the past have been made to overcome the drawback of the narrowness of the ripped path—as by attaching trailing portions, called flippers or breakers, to the ripper shank, which gave the upset ground a horizontal component of movement.

In so doing, the basic objective of the ripper was often frustrated—the ripper lost its penetrating capacity—so that what was intended to be an improvement posed a dilemma. The problem facing the art was thus to provide a ripper characterized by "high penetrating ability" and one which would impart to the ripped material a substantial horizontal component so as to avoid the drawback of a narrow ripped path.

It is a principal object of this invention to provide a novel ripper structure which solves this dilemma in that the ripper shank is equipped with side structures for widening the path, yet which are also effective to enhance the penetrability.

Another object of the invention is to provide a ripper shank equipped with laterally-extending, vane-like portions which are selectively positionable to break out the ground yet serve to pull the ripper point into the ground and thus achieve an advantageously wide furrow.

A further object is to provide a novel ripper structure characterized by uniquely assembled components, including positionable side vanes and a shroud, which cooperate to improve the ripping efficiency of the device.

Other objects and advantages of the invention may be seen in the details of construction and operation set down in this specification.

The invention will be described in conjunction with the accompanying drawing, in which—

FIG. 1 is a perspective view of a ripper shank constructed according to teachings of this invention;

FIG. 2 is an enlarged perspective view of one of the side vane attachments provided in the FIG. 1 showing;

FIG. 3 is a view similar to FIG. 2 but showing an attachment with a somewhat differently shaped vane;

FIG. 4 is an enlarged fragmentary elevational view of the ripper of FIG. 1, featuring the lower or foot portion thereof, and with the vane member seen in an alternative position in dotted line;

FIG. 5 is a front elevational view of the structure seen in FIG. 4;

FIG. 6 is a sectional view taken along the line 6—6 of FIG. 4;

FIG. 7 is a sectional view taken along the line 7—7 of FIG. 4; and

FIG. 8 is an enlarged sectional view taken along the line 8—8 of FIG. 7.

In the illustration given, and with particular reference to FIG. 1, the numeral 10 designates generally a ripper shank assembly which is adapted to be mounted on a tractor (not shown). The ripper shank assembly includes an elongated shank 11 which is seen to be equipped with horizontally-extending mounting holes 12 so as to position the long dimension of the shank 11 generally vertically. The extreme upper end of the shank is equipped with an eye 13 for convenience in mounting and dismounting the ripper shank assembly 10.

The lower end of shank 11 is seen to be equipped with a foot-like portion 14 equipped with a nose 14a over which is mounted a removable point 15 as by a locking pin 16 (see also FIG. 4). This much of the shank construction is well known and has only been set down for the sake of completeness of disclosure.

The shank is seen to be equipped with a forward wall 17 equipped with an arcuate portion as at 17a (see FIG. 4). Mounted over the arcuate portion 17a and extending about the front lower portion of the shank 11 and point 15 is a shroud 18. As can be appreciated from FIG. 6, the shroud 18 is generally channel-shaped in cross section. Thus, the shroud 18 has a front wall 19 bearing against the front wall 17 of the shank, and side walls 20 bearing against the side walls 21 of the shank 11. The side walls 20 of the shroud 18 are apertured as at 18a for the receipt of a mounting bolt 22 and the bolt head and nut 22a are protected by ears or wings 20a.

The shank is seen to be equipped with a heel portion 23 and there is provided within the heel portion 23 a horizontally-extending opening 24 (see FIG. 8). The opening 24 is generally circular in outline and in the aperture-defining wall is equipped with a plurality of equally spaced-apart inwardly radially extending splines or teeth 25 (again see FIG. 8). The splines 25 are horizontally elongated, and thus give the impression of a ring gear.

Mounted within the opening 24 and engaged by the splines 25 are a pair of vane elements generally designated 26, one of which can be seen in perspective view in FIG. 2. Each vane element 26 is seen to include a generally cylindrical body 27 characterized by splines or gear teeth 28 which mate with the splines 25. However, the length of the splines 28 is slightly less than one-half that of the splines 25 to accommodate two identical elements 26 in the aperture 24. The body 27 at its outer extremity is equipped with an integral disc-like portion 29 which has a diameter slightly greater than the diameter of the aperture 24 so as to provide, in effect, an end plate.

Provided integrally with the disc-like end plate portion 29 is a laterally-extending vane portion 30. The vane portion 30, as can be readily appreciated from FIG. 1, is generally triangular in outline when viewed from above and in the position shown. Also, as can be appreciated from a consideration of FIGS. 7 and 8, the vanes 30 are outwardly tapered.

The vane elements 26 are held in place and together by means of nut and bolt assemblies generally designated 31. Two assemblies 31 are provided, as can be appreciated from a consideration of FIG. 7. For this purpose, each vane element 26 is apertured as at 32 and 33 on opposite sides of the vane 30. As seen, the line connecting the two bolt assembly center lines (see FIG. 8) is generally perpendicular to the main plane of the vanes 30.

In operation, the vane elements 26 are slid into place to mate the splines 25 and 28, one element 26 being mounted from the left side of the shank 11 while the other element 26 is mounted from the right side. The vanes 30 are necessarily in the same plane since to secure the element 26 together, it is necessary to have the openings 32 and 33 in each element aligned for the receipt of the nut and bolt assemblies 31.

As can be appreciated from FIG. 4, the angle of the vanes 30 can be varied, an alternative position being shown in dotted line and designated 30a.

In operation, earth which is upset by the point 15 impinges upon the upper surface of the vanes 30 which exerts a depressing action on the point 15 tending to make it penetrate deeper and more effectively into the ground. Aiding in this connection is the shroud 18 which deflects the upset earth laterally and away from the disc-like portion 29 with which the side walls 20 of the shroud 18 are aligned.

It has been found that the vanes 30 can be varied as much as 40 degrees to the horizontal to achieve superior penetration while still maintaining advantageous horizontal break out capability of the upset earth.

It has been found advantageous in certain types of earth working to vary the shape of the vane 30 and such is presented in FIG. 3 when the numeral 130 designates a thinner wider vane provided on the body 27, the outline of the vane 130 being shown in dotted line in FIG. 6 and so designated.

While in the foregoing specification, a detailed description of an embodiment of the invention has been shown for the sake of acquainting those skilled in the art with the practice of the invention, many variations in the details herein given may be made by the skilled art workers without departing from the spirit and scope of the invention.

I claim:

1. A vane-equipped ripper, comprising an elongated shank adapted to be disposed generally vertically when secured to a tractor, or the like, said shank having at its lower end a penetrating foot portion and a heel portion having generally parallel sides, an opening extending transversely through said heel portion from one side to the other, said opening having an internal wall defining a ring gear configuration and providing thereby a plurality of parallel splines, a pair of vane members mounted on said shank and being partially received in said opening, each vane member having a spline-equipped body portion mounted in said opening and a flange portion external to said opening and bearing against one of said sides, a generally horizontally disposed vane element integral with said flange and body portions and projecting laterally away from said shank, a pair of aligned bolt openings extending through each vane member on opposite sides of each vane element, and bolt means extending through said aligned openings coupling said vane members together, said body portions being sized relative to said heel portion opening to position said flange portions in bearing relation with said sides when said vane members are secured together by said bolt means.

2. The structure of claim 1 in which each vane element is generally plate-like, the line of centers connecting the bolt openings in each plate being generally perpendicular to said plate-like vane element.

3. The structure of claim 2 in which each vane element is generally triangular when viewed along said center lines and in which each vane element is tapered rearwardly from said foot portion in proceeding laterally away from said flange portion.

References Cited in the file of this patent

UNITED STATES PATENTS

| | | |
|---|---|---|
| 226,641 | Wansbrough et al. | Apr. 20, 1880 |
| 316,403 | Schroeder | Apr. 21, 1885 |
| 1,391,012 | Schulder | Sept. 20, 1921 |
| 2,129,453 | Van Sickle | Sept. 6, 1938 |
| 2,569,556 | Collins et al. | Oct. 2, 1951 |
| 3,001,591 | Johnson | Sept. 26, 1961 |

FOREIGN PATENTS

| | | |
|---|---|---|
| 1,100,292 | France | Mar. 30, 1955 |